(12) United States Patent
Kim

(10) Patent No.: US 12,116,049 B2
(45) Date of Patent: Oct. 15, 2024

(54) RACK-DRIVEN POWER ASSISTED STEERING DEVICE

(71) Applicant: HL MANDO CORPORATION, Pyeongtaek-si (KR)

(72) Inventor: Hyeon Su Kim, Yongin-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 99 days.

(21) Appl. No.: 17/610,941

(22) PCT Filed: May 14, 2020

(86) PCT No.: PCT/KR2020/006361
§ 371 (c)(1),
(2) Date: Nov. 12, 2021

(87) PCT Pub. No.: WO2020/235864
PCT Pub. Date: Nov. 26, 2020

(65) Prior Publication Data
US 2022/0242476 A1 Aug. 4, 2022

(30) Foreign Application Priority Data
May 22, 2019 (KR) .................. 10-2019-0059893

(51) Int. Cl.
*B62D 5/04* (2006.01)
(52) U.S. Cl.
CPC ........ *B62D 5/0448* (2013.01); *B62D 5/0424* (2013.01)

(58) Field of Classification Search
CPC ...... F16C 33/41; F16C 33/418; F16C 33/581; F16C 33/60; F16C 33/605; B62D 5/0445; B62D 5/0448
See application file for complete search history.

(56) References Cited

U.S. PATENT DOCUMENTS

| | | | |
|---|---|---|---|
| 6,269,711 B1 * | 8/2001 | Tejima | F16C 35/063 384/512 |
| 6,499,369 B1 | 12/2002 | Piotrowski et al. | |
| 9,409,594 B2 * | 8/2016 | Kimpian | B62D 5/0448 |

(Continued)

FOREIGN PATENT DOCUMENTS

| | | |
|---|---|---|
| CN | 106936260 A | 7/2017 |
| CN | 107571910 A | 1/2018 |

(Continued)

OTHER PUBLICATIONS

International Search Report (PCT/ISA/210) issued in PCT Application No. PCT/KR2020/006361 dated Aug. 25, 2020 with English Translation.

(Continued)

*Primary Examiner* — Bobby Rushing, Jr.
(74) *Attorney, Agent, or Firm* — Hauptman Ham, LLP

(57) ABSTRACT

According to the present embodiments, provided is a rack-driven power assisted steering device in which a rolling member supporting the rotation of a ball nut is provided in a double row, a ball nut assembly is coupled to a housing through an elastic member, the flow of the ball nut is absorbed to improve noise performance, and the rolling member is directly supported by the ball nut or a support member, so that the number of parts can be reduced and easy assembly is possible.

7 Claims, 9 Drawing Sheets

(56) References Cited

U.S. PATENT DOCUMENTS

| | | | |
|---|---|---|---|
| 2006/0117880 A1* | 6/2006 | Osterlanger | B62D 5/0448 74/89.23 |
| 2012/0103115 A1 | 5/2012 | Wu et al. | |
| 2013/0161114 A1* | 6/2013 | Bando | F16C 27/066 180/443 |
| 2014/0096633 A1 | 4/2014 | Chang et al. | |
| 2017/0089436 A1* | 3/2017 | Eyraud | F16C 33/581 |
| 2019/0161111 A1* | 5/2019 | Kondo | F16C 33/60 |

FOREIGN PATENT DOCUMENTS

| | | | | |
|---|---|---|---|---|
| CN | 109533010 A | | 3/2019 | |
| EP | 3459821 A1 | | 3/2019 | |
| FR | 3043748 A1 | * | 5/2017 | ............ F16C 19/185 |
| JP | 2006232048 A | * | 9/2006 | |
| JP | 4807655 B2 | * | 11/2011 | ............ B62D 5/0448 |
| JP | 2014-227047 A | | 12/2014 | |
| JP | 2016-97840 A | | 5/2016 | |
| JP | 6291725 B2 | * | 3/2018 | ............ B62D 5/0445 |
| JP | 2019-055758 A | | 4/2019 | |
| KR | 10-2014-0115794 A | | 10/2014 | |
| KR | 10-2018-0094321 A | | 8/2018 | |
| WO | WO-2021188328 A1 | * | 9/2021 | |

OTHER PUBLICATIONS

Written Opinion (PCT/ISA/237) issued in PCT Application No. PCT/KR2020/006361 dated Aug. 25, 2020.

Korean Notice of Allowance issued on Apr. 7, 2024, in connection with the Korean Patent Application No. 10-2019-0059893, with its English translation, 3 pages.

Chinese Office Action issued on Apr. 20, 2024, in connection with the Chinese Patent Application No. 202080038023.5, with its English translation, 19 pages.

Chinese Office Action issued on Dec. 21, 2023, in connection with the Chinese Patent Application No. 202080038023.5, with partial English translation (18 pages).

Korean Office Action issued on Jan. 30, 2024, in connection with the Korean Patent Application No. 10-2019-0059893, with English translation (12 pages).

* cited by examiner

RACK-DRIVEN POWER ASSISTED STEERING DEVICE

TECHNICAL FIELD

The present disclosure relates to a power assisted steering apparatus, and more specifically, to a rack-driven power assisted steering apparatus capable of improving noise performance by absorbing the movement of a ball nut, reducing the number of components employed therein, and easily assembling the employed components.

BACKGROUND ART

A rack-driven power assisted steering apparatus includes a driving assembly for generating power by the controlling of an electronic control unit (ECU) that determines the degree of steering of a steering wheel through a torque sensor mounted on an upper portion of a steering column, a rack bar for moving a tie rod connected to a wheel according to a steering degree of the steering wheel, and a driven assembly for converting a rotational force imparted from the driving assembly to an axial translational force, and transferring the converted force to the rack bar.

Here, the driving assembly normally includes an electric motor controlled by the electronic control unit (ECU), a motor pulley mounted to the shaft of the electric motor, and a belt wound around the motor pulley. The driven assembly includes a ball nut surrounding the rack bar, and a nut pulley coupled to the outer peripheral surface of the ball nut and wound around the belt.

However, such a conventional rack-driven power assisted steering apparatus has suffered from low noise performance as a bearing supporting the rotation of the ball nut is provided in a single row, and thereby, load caused by the movement of the ball nut cannot be effectively absorbed. Further, even if the bearing is provided in double rows, there have been problems such as an increased number of components, complicate assembling, and the like.

DETAILED DESCRIPTION OF THE INVENTION

Technical Problem

To address these issues, embodiments of the present disclosure provide a rack-driven power assisted steering apparatus capable of: improving noise performance by absorbing the movement of a ball nut in a structure in which rolling members supporting the rotation of the ball nut are arranged in double rows, and a ball nut assembly is coupled to a housing via an elastic member; reducing the number of components employed for supporting the rolling members; and easily assembling the employed components.

Technical Solution

According to aspects of the present disclosure, a rack-driven power assisted steering apparatus is provided that includes a housing, first and second rolling members, a ball nut that includes a support portion having an outward protrusion protruding from an outer circumferential surface of the support portion, and supports the first and second rolling members on respective side surfaces of the outward protrusion in an axial direction, a first support member disposed between the housing and the first rolling member, and a second support member disposed between the housing and the second rolling member.

According to aspects of the present disclosure, a rack-driven power assisted steering apparatus is provided that includes a housing, first and second rolling members, a support member that is supported by the housing, includes an inward protrusion protruding from an inner circumferential surface of the support member, and supports the first and second rolling members on respective side surfaces of the inward protrusion in an axial direction, a ball nut including a support portion for supporting the first rolling member, and a coupling member that is coupled to the ball nut and supports the second rolling member.

Effects of the Invention

According to embodiments of the present disclosure, it is possible to provide a rack-driven power assisted steering apparatus capable of: improving noise performance by absorbing the movement of a ball nut in a structure in which rolling members supporting the rotation of the ball nut are arranged in double rows, and a ball nut assembly is coupled to a housing via an elastic member; reducing the number of components employed as the rolling members are directly supported on the ball nut or at least one support member; and easily assembling the employed components.

BEST MODE FOR CARRYING OUT THE INVENTION

Figure 1:
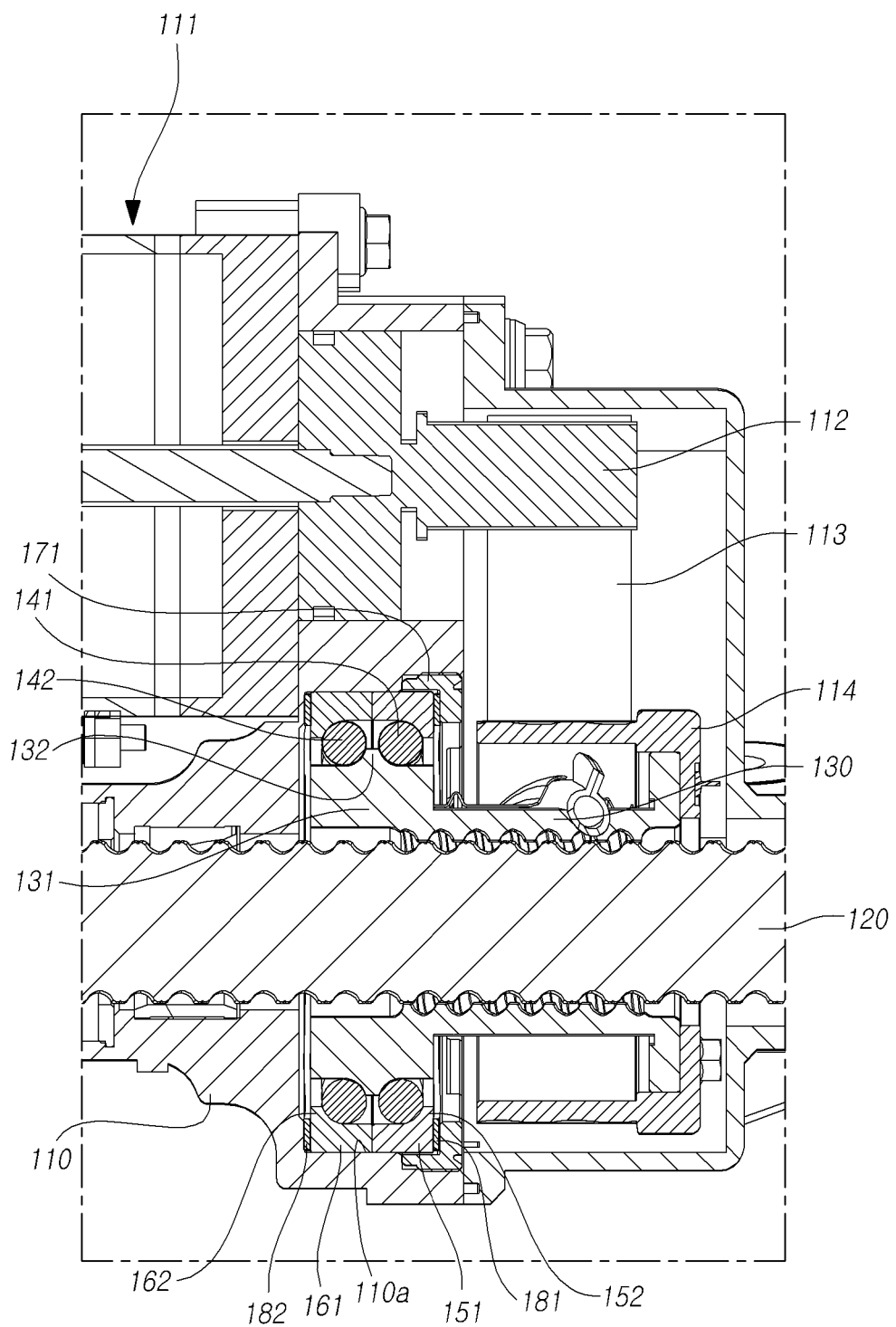
FIG. 1 is a cross-sectional view of a rack-driven power assisted steering apparatus according to aspects of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
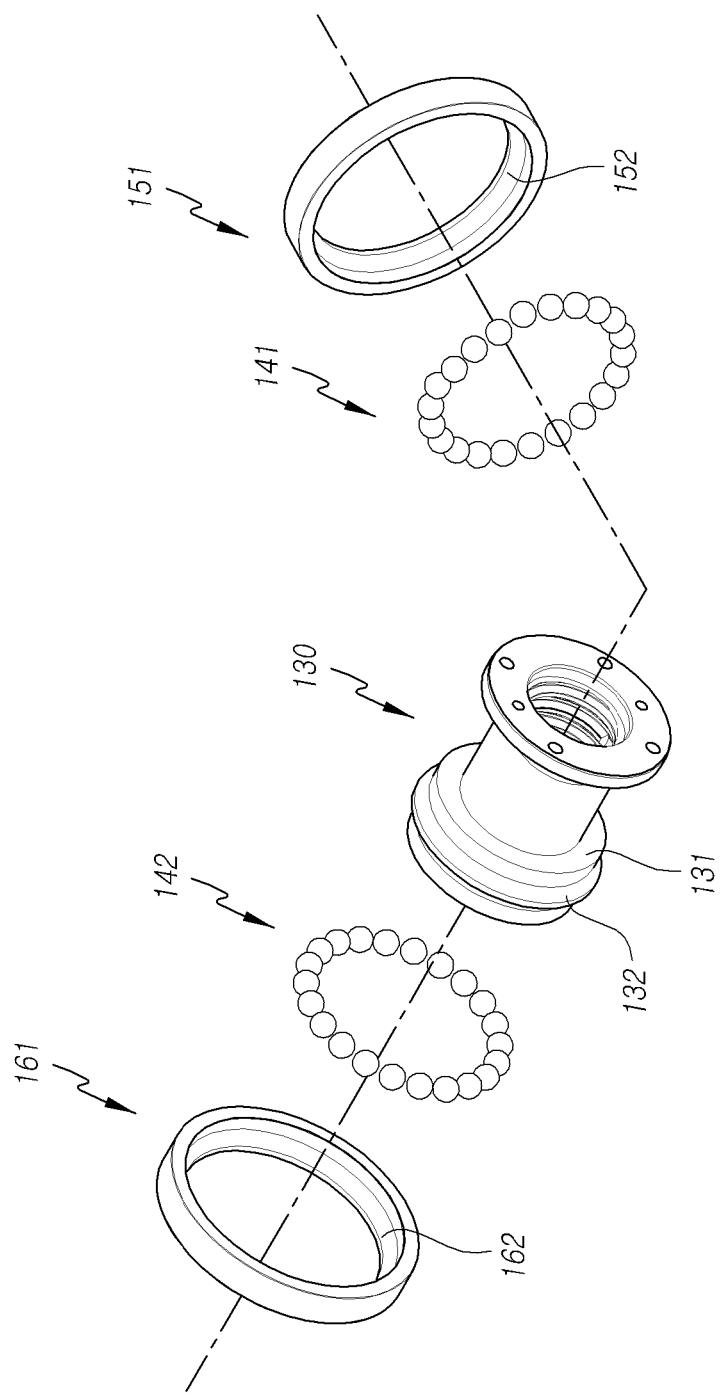
FIG. 2 is an exploded perspective view for a portion of FIG. 1.
Figure 3:
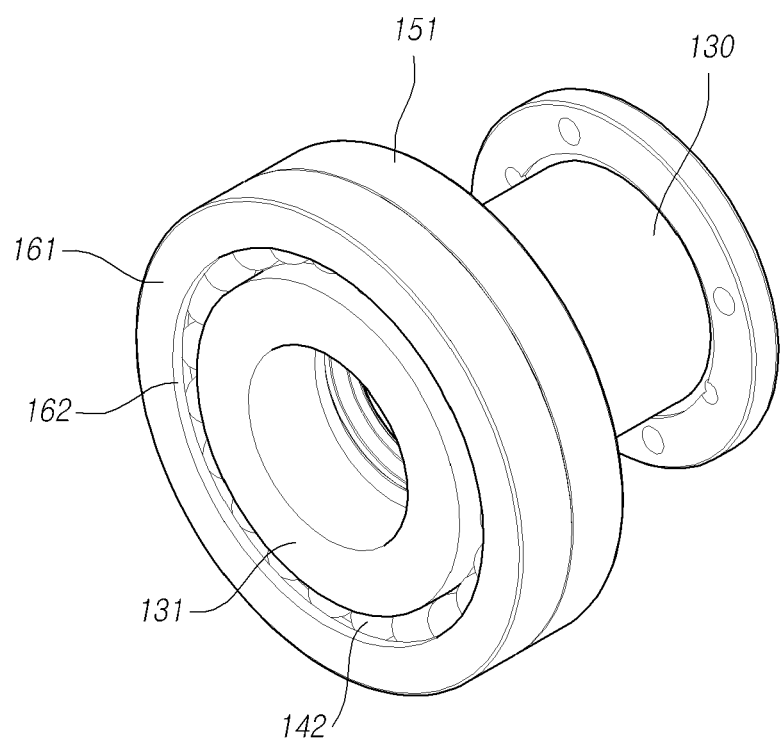
FIG. 3 is a perspective view of a structure in which components of FIG. 2 are assembled.
Figure 4:
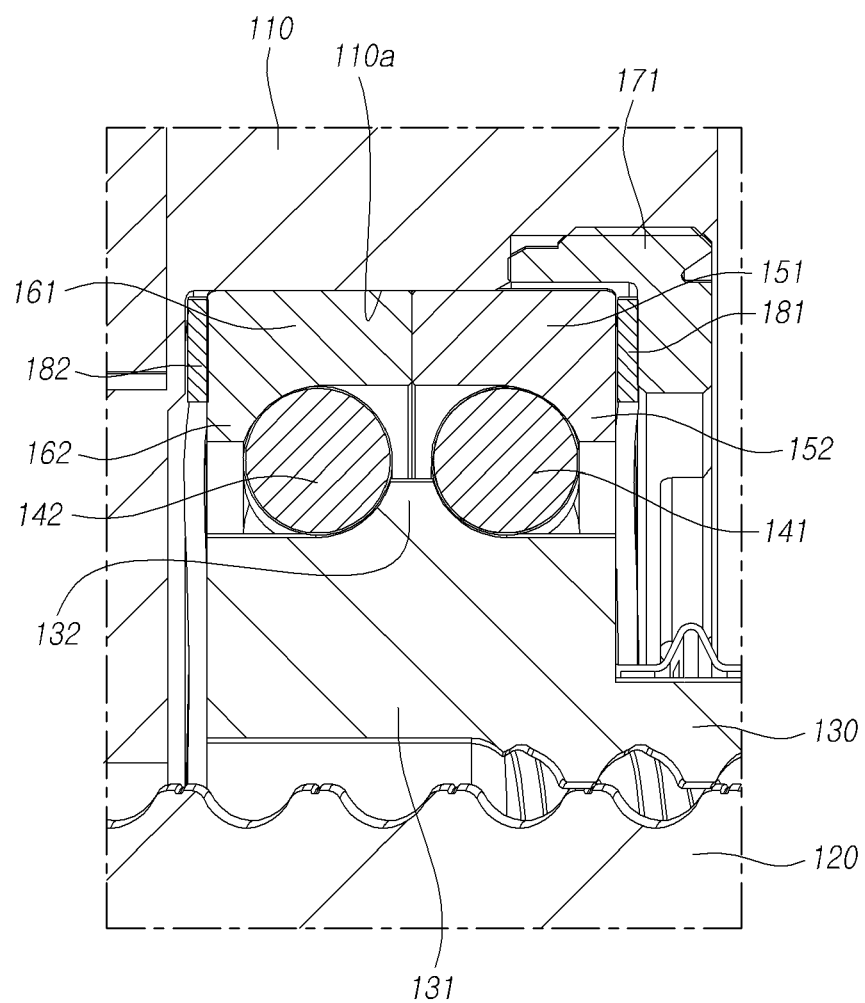
FIG. 4 is an exploded view for a portion of FIG. 1.
Figure 5:
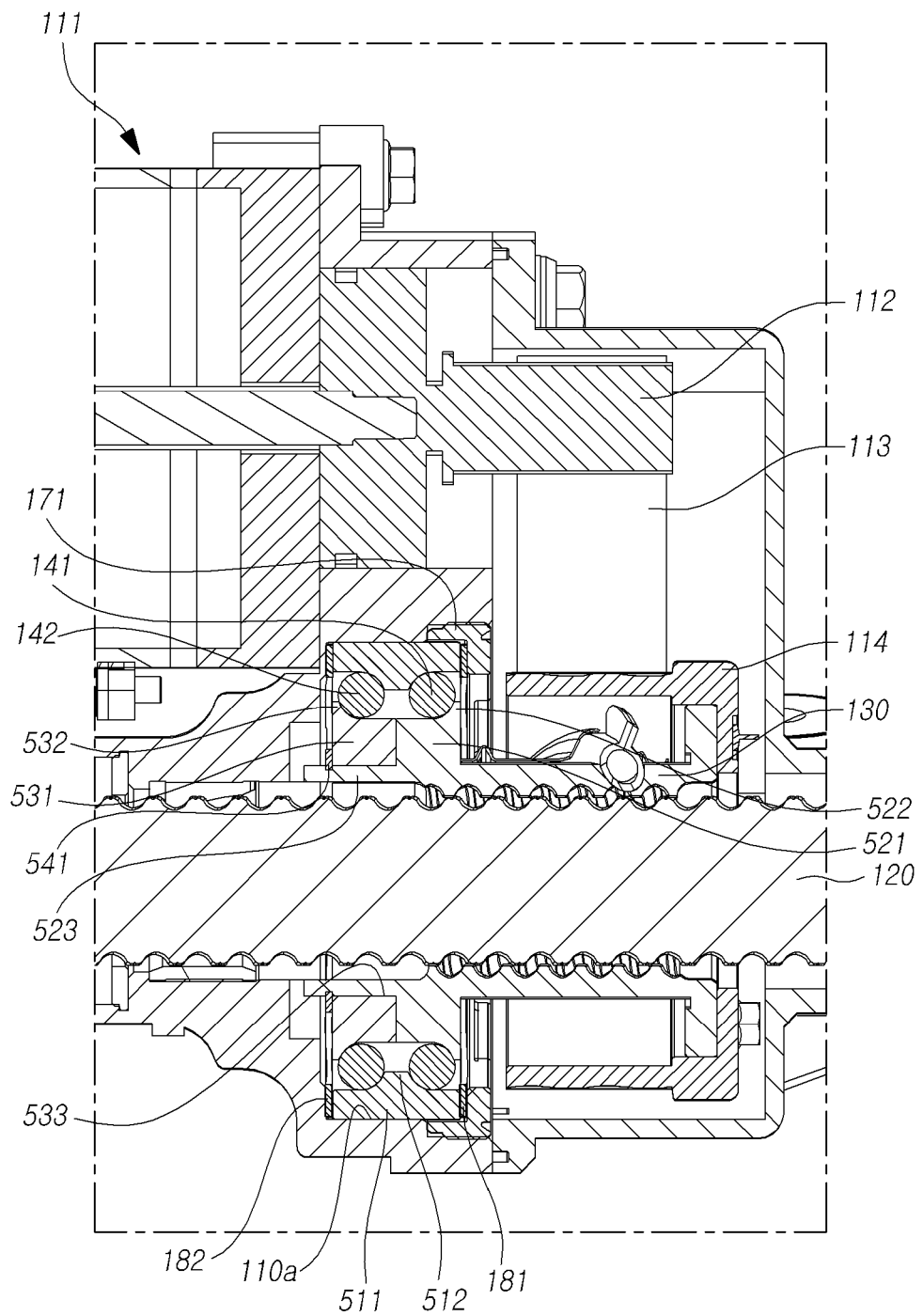
FIG. 5 is a cross-sectional view of a rack-driven power assisted steering apparatus according to aspects of the present disclosure.
Figure 6:
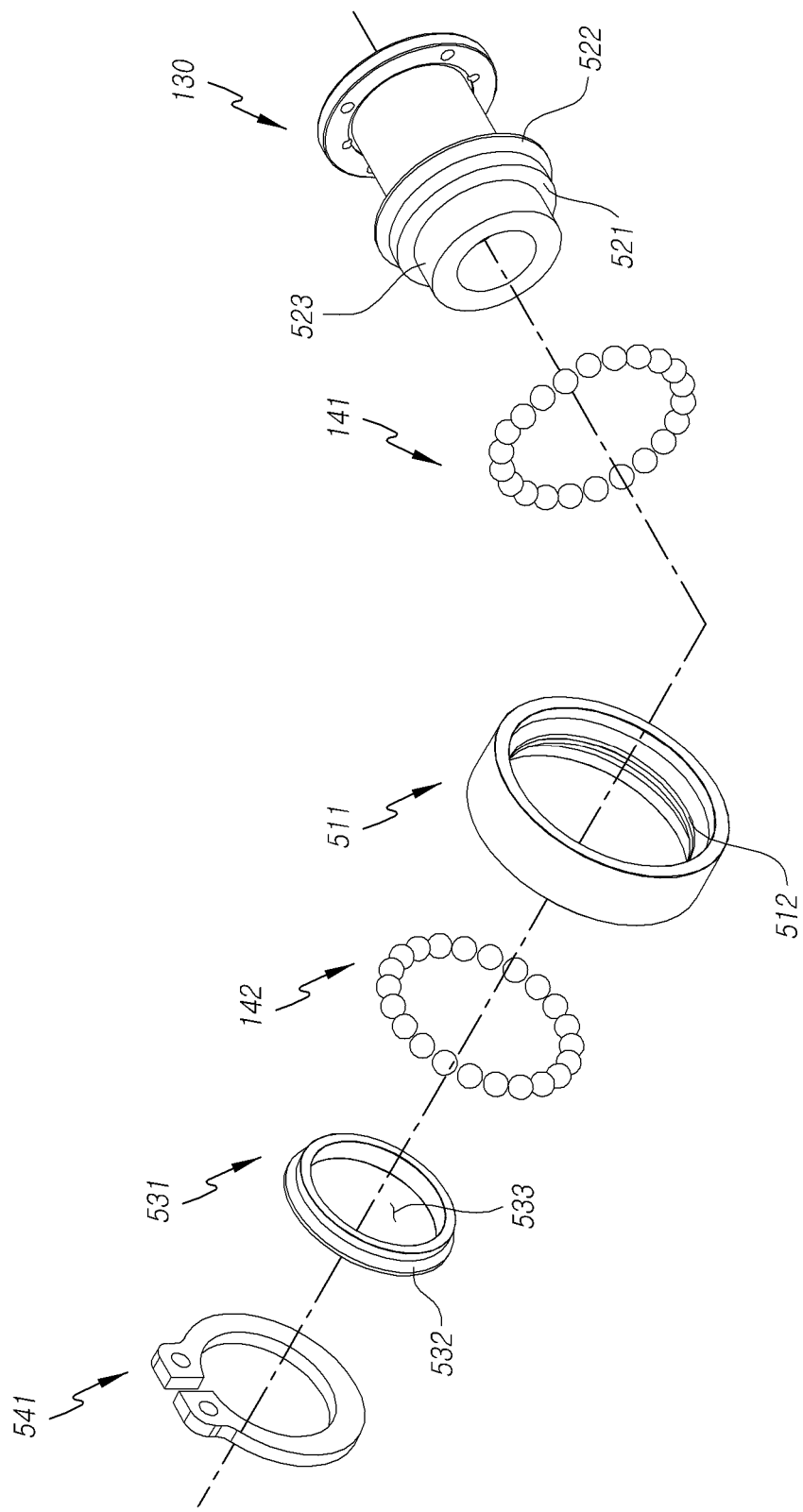
FIG. 6 is an exploded perspective view for a portion of FIG. 5.
Figure 7:
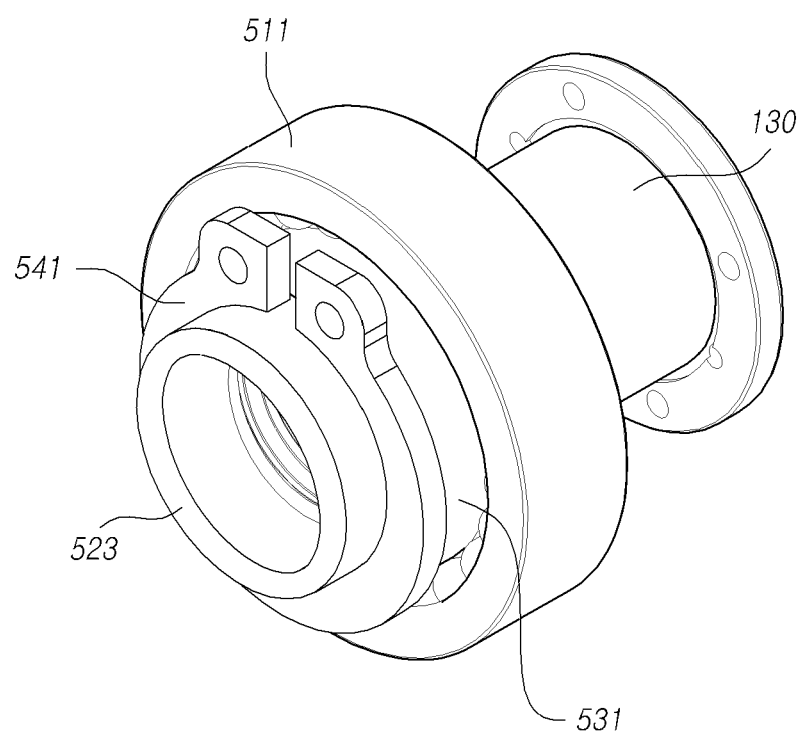
FIG. 7 is a perspective view of a structure in which components of FIG. 6 are assembled.
Figure 8:
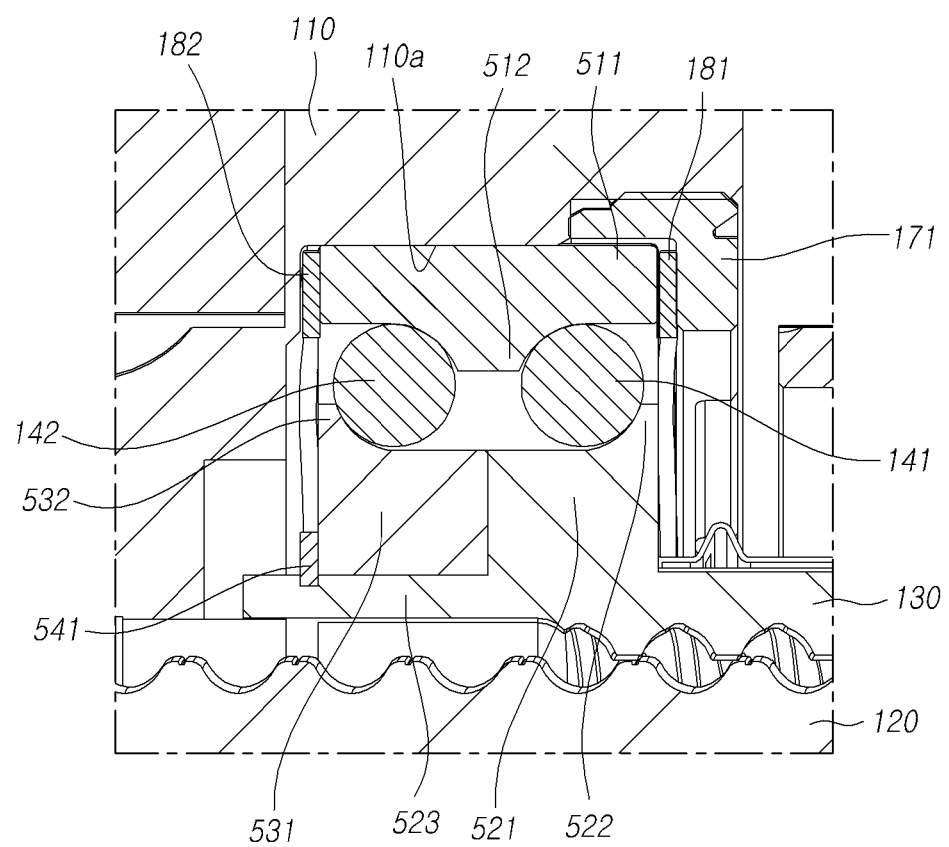
FIG. 8 is an exploded view for a portion of FIG. 5.
Figure 9:
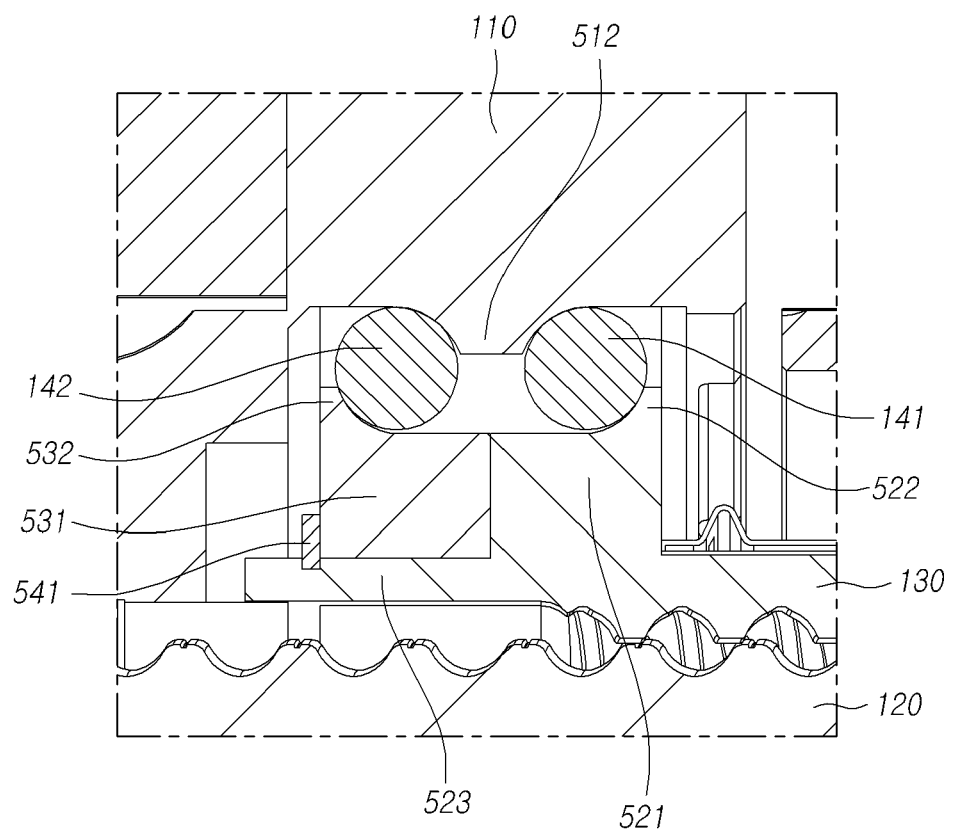
FIG. 9 is a cross-sectional view of a portion of the rack-driven power assisted steering apparatus according to aspects of the present disclosure.

FIG. 1 is a cross-sectional view of a rack-driven power assisted steering apparatus according to aspects of the present disclosure, FIG. 2 is an exploded perspective view for a portion of FIG. 1; FIG. 3 is a perspective view of a structure in which components of FIG. 2 are assembled; FIG. 4 is an exploded view for a portion of FIG. 1; FIG. 5 is a cross-sectional view of a rack-driven power assisted steering apparatus according to aspects of the present disclosure; FIG. 6 is an exploded perspective view for a portion of FIG. 5; FIG. 7 is a perspective view of a structure in which components of FIG. 6 are assembled, FIG. 8 is an exploded view for a portion of FIG. 5; and FIG. 9 is a cross-sectional view of a portion of the rack-driven power assisted steering apparatus according to aspects of the present disclosure.

Hereinafter, a rack-driven power assisted steering apparatus according to aspects of the present disclosure is described with reference to FIGS. 1 to 4.

The rack-driven power assisted steering apparatus according to aspects of the present disclosure includes a housing 110, first and second rolling members 141 and 142, a ball nut 130 that includes a support portion 131 having a first outward protrusion 132 protruding from an outer circumferential surface of the support portion 131, and supports the first and second rolling members 141 and 142 through respective side surfaces of the first outward protrusion 132 in an axial direction, a first support member 151 disposed between the housing 110 and the first rolling member 141, and a second support member 161 disposed between the housing 110 and the second rolling member 142.

Referring to FIG. 1, ball screw threads are formed on the inner peripheral surface of the ball nut 130 and the outer peripheral surface of a rack bar 120, and the ball nut 130 and the rack bar 120 can be coupled via one or more balls.

A nut pulley 114 may be coupled to the ball nut 130, and a motor pulley 112 may be coupled to a motor shaft of the motor 111. The nut pulley 114 and the motor pulley 112 may be connected by a belt 113, and thereby, the motor 111 can rotates the ball nut 130.

The rack bar 120 may be coupled to a pinion shaft of the steering shaft, and can axially slide and steer wheels according to the turning of the steering wheel by a driver. Further, as the ball nut 130 rotates, the torque of the motor 111 can be translated and then transferred to the rack bar 120 to assist the steering.

In this case, a first rolling member 141, a second rolling member 142, a first supporting member 151 and a second supporting member 161 may be employed in order to: enable the ball nut 130 to rotate smoothly through reduced friction; prevent or reduce the movement of the ball nut 130 caused by vibration of the motor 111 transferred via the belt 113, road impact transferred via the rack bar 120, and the like; and improve noise performance.

Referring to FIGS. 2 to 3, the ball nut 130 may include the support portion 131 for supporting the first rolling member 141 and the second rolling member 142. The first outward protrusion 132 may be formed on the outer peripheral surface of the support portion 131. The first rolling member 141 may be supported on one side surface of the first outward protrusion 132 in the axial direction, and the second rolling member 142 may be supported on the other side surface of the first outward protrusion 132 in the axial direction.

The first and second rolling members 141 and 142 may include multiple first and second rolling members 141 and 142, respectively, and be arranged in the circumferential direction on respective side surfaces of the first outward protrusion 132 interposed therebetween.

As the rotation of the ball nut 130 is supported by the first and second rolling members 141 and 142, the rotation of the ball nut 130 can be supported in a wider range in the axial direction comparing with a situation where rolling members are arranged in a single row. Further, since supporting capacity for radial and axial loads can be increased due to an increased number of rolling members, thereby, the movement of the ball nut 130 can be prevented or reduced and the noise performance can be improved.

In some embodiments, as shown in figures, balls, cylindrical rollers or the like may be used as the first rolling member 141 and the second rolling member 142.

In a situation where balls are used as the first rolling member 141 and the second rolling member 142, side surfaces of the first outward protrusion 132, a first inward protrusion 152 and a second inward protrusion 162, which are described below in further detail, may have inwardly curved surfaces. Thus, this enables the first rolling member 141 or the second rolling member 142 to be supported in a wide area.

The first support member 151 may be disposed between the first rolling member 141 and the housing 110, and the second support member 161 may be disposed between the second rolling member 142 and the housing 110. Thereby, the first rolling member 141 and the second rolling member 142 can be supported in the housing 110 via the first support member 151 and the second support member 161.

The first support member 151 and the second support member 161 may have the first inward protrusion 152 and the second inward protrusion 162, respectively, and thereby, can support the first rolling member 141 and the second rolling member 142 in the axial direction.

That is, the first and second rolling members 141 and 142 and the first and second support members 151 and 161 may be assembled in the order of the first rolling member 141 and the first support member 151 from one side, and in the order of the second rolling member 142 and the second support member 161 from the other side, in the axial direction with respect to the first outward protrusion 132.

Meanwhile, in order for the torque of the motor 111 to be translated by the rotation of the ball nut 130 and then transferred to the rack bar 120, a lock screw 171 for fixing the ball nut 130 in the axial direction may be employed as shown in FIG. 1.

That is, one of the first support member 151 and the second support member 161 may be axially supported by the housing 110, and the other of the first support member 151 and the second support member 161 may be axially supported by the lock screw 171 coupled to the housing 110.

A stepped portion 110a may be disposed on an inner circumferential surface of the housing 110. The first support member 151 and the second support member 161 can be placed on the stepped portion 110a, and the lock screw 171 may be coupled to the housing 110 on the opposite side of the stepped portion 110a.

Figures show embodiments in which the first support member 151 is axially supported by the lock screw 171 and the second support member 161 is axially supported by the housing 110.

Since the first support member 151 and the second support member 161 are disposed between the housing 110 and the lock screw 171, the first outward protrusion 132 can be supported between the first rolling member 141 and the second rolling member 142, and the ball nut 130 can be fixed in the axial direction with respect to the housing 110, and rotated by the motor 111.

In this structure, one or more elastic members 181 and 182 may be disposed in the axial direction at at least one of a location between one of the first support member 151 and the second support member 161 and the housing 110 and a location between the other one of the first support member 151 and the second support member 161 and the lock screw 171, and thereby, the movement of the ball nut 130 can be prevented or reduced and the noise performance can be improved.

As shown in figures, in some embodiments, the elastic members 181 and 182 are disposed at both of a location between the first support member 151 and the lock screw 171 and a location between the second support member 161 and the housing 110. Accordingly, the movement of the ball nut 130 can be buffered by the elastic members 181 and 182, and the noise performance can be improved.

A bush having rigidity, preferably, a wave washer may be used as the elastic members 181 and 182, Referring to FIG. 4, as described above, the first rolling member 141 and the second rolling member 142 may be disposed on both sides of the first outward protrusion 132. In this case, in order to easily assemble the first rolling member 141 and the second rolling member 142, an outer diameter of the remaining portion of the support portion 131 except for the first outward protrusion 132 may be needed to be smaller than that of the first outward protrusion 132.

That is, an outer diameter of the support portion 131 from one end thereof in the axial direction to the first outward protrusion 132 and an outer diameter of the support portion 131 from the other end thereof in the axial direction to the first outward protrusion 132 may be smaller than an outer diameter of the first outward protrusion 132.

Herein, "one end" and "one side surface" may denote an end and a surface on the right side (or the left side) of corresponding components in the axial direction, respectively, and "the other end" and "the other side surface" may denote an end and a surface on the left side (or the right side) of the components in the axial direction, respectively.

In other words, the outer diameter of the outer circumferential surface of the remaining portion of the support portion 131 except for the first outward protrusion 132 may be smaller than the outer diameter of the first outward protrusion 132.

In general, the first rolling member 141 and the second rolling member 142 are assembled in a situation of being coupled to a retainer. One or more first rolling member 141 and one or more second rolling members 142 coupled to the retainer are axially inserted from one end or the other end of the support portion 131 in the axial direction and supported on the outer circumferential surface of the support portion 131 without being caught, and thereafter, caught by the first outward protrusion 132 and placed on the support portion 131.

Further, the first support member 151 may include a first inward protrusion 152 that inwardly protrudes from the inner circumferential surface thereof and supports the first rolling member 141, and the second support member 161 may include a second inward protrusion 162 that inwardly protrudes from the inner circumferential surface thereof and supports the second rolling member 142.

The first inward protrusion 152 may be disposed at one end of the first support member 151 in the axial direction and can support the first rolling member 141 through the other side surface of the first inward protrusion 152, and the second inward protrusion 162 may be disposed at the other end of the second support member 161 in the axial direction and can support the second rolling member 142 through one side surface of the second inward protrusion 162.

That is, the first rolling member 141 may be disposed between the first outward protrusion 132 and the first inward protrusion 152, and the second rolling member 142 may be disposed between the first outward protrusion 132 and the second inward protrusion 162.

The first rolling member 141 may be fixed, or operatively disposed, in the axial direction between the support portion 131 and the first support member 151 by the first outward protrusion 132 and the first inward protrusion 152, and the second rolling member 142 may be fixed, or operatively disposed, in the axial direction between the support portion 131 and the second support member 161 by the first outward protrusion 132 and the second inward protrusion 162.

In this case, an inner diameter of the first support member 151 from the other end thereof in the axial direction to the first inward protrusion 152 may be greater than an inner diameter of the first inward protrusion 152, and an inner diameter of the second support member 161 from one end thereof in the axial direction to the second inward protrusion 162 may be greater than an inner diameter of the second inward protrusion 162.

That is, an inner diameter of the inner circumferential surface of the remaining portion of the first support member 151 except for the first inward protrusion 152 may be greater than the inner diameter of the first inward protrusion 152, and an inner diameter of the inner circumferential surface of the remaining portion of the second support member 161 except for the second inward protrusion 162 may be greater than the inner diameter of the second inward protrusion 162.

Since the first support member 151 and the second support member 161 are disposed outside of the first rolling member 141 and the second rolling member 142 with respect to the first outward protrusion 132, when the first support member 151 is assembled from one side in the axial direction to the other side, the first rolling member 141 can be supported on the inner circumferential surface of the first supporting member 151 without being caught at the other end of the first supporting member 151, and thereafter, be placed on the first support member 151 by being caught by the first inward protrusion 152, and when the second support member 161 is assembled from the other side in the axial direction to one side, the second rolling member 142 can be supported on the inner circumferential surface of the second supporting member 161 without being caught at one end of the second supporting member 161, and thereafter, be placed on the second support member 161 by being caught by the second inward protrusion 162.

That is, when the first rolling member 141 and the first support member 151 are assembled at one side with respect to the first outward protrusion 132, and the second rolling member 142 and the second support member 161 are assembled at the other side, as the outer diameter of the support portion 131 from one end and the other end thereof in the axial direction to the first outward protrusion 132 is smaller than that of the first outward protrusion 132, the first rolling member 141 and the second rolling member 142 can be supported on the outer circumferential surface of the support portion 131 without being caught at one end and the other end of the support portion 131, and thereafter, be placed in the support portion 131 by being caught by the first outward protrusion 132, and as the inner diameter of the first support member 151 from the other end thereof in the axial direction to the first inward protrusion 152 is greater than that of the first inward protrusion 152, and the inner diameter of the second support member 161 from one end thereof in the axial direction to the second inward protrusion 162 is greater than that of the second inward protrusion 162, the first rolling member 141 and the second rolling member 142 can be supported on the inner circumferential surface of the first support member 151 and on the inner circumferential surface of the second support member 161 without being caught at the other end of the first support member 151 and at one end of the second support member 161, and thereafter, be placed by being caught by the first inward protrusion 152 and the second inward protrusion 162.

Therefore, the first rolling member 141 and the second rolling member 142, the first supporting member 151, the second supporting member 161, and the ball nut 130 can be assembled by simply sliding in the axial direction. In turn, convenience of assembling can be improved, and the number of components required to support the rotation of the rolling members can be reduced compared to the conventional steering device.

Hereinafter, a rack-driven power assisted steering apparatus according to aspects of the present disclosure is described with reference to FIGS. 5 to 9. Some components of the steering apparatus of FIGS. 5 to 9 may be equal, or substantially equal, to those of the steering apparatus of FIGS. 1 to 4, and thus, such components are labeled with like reference numbers, the details of which may be replaced by the discussions conducted above.

The rack-driven power assisted steering apparatus according to aspects of the present disclosure includes a housing 110, first and second rolling members 141 and 142, a support member 511 that is supported by the housing 110, includes a third inward protrusion 512 protruding from an inner circumferential surface of the support member 511, and supports the first and second rolling members 141 and 142 on respective side surfaces of the third inward protrusion 512 in the axial direction, a ball nut 130 including a support portion 521 for supporting the first rolling member 141, and a coupling member 531 that is coupled to the ball nut 130 and supports the second rolling member 142.

Referring to FIG. 5, the nut pulley 114 coupled to the ball nut 130 and the motor pulley 112 coupled to the motor shaft of the motor 111 may be connected by the belt 113, and as the ball nut 130 rotates, the torque of the motor 111 can be translated and then transferred to the rack bar 120 to assist the steering.

In this case, the first rolling member 141, the second rolling member 142, the support member 511, the coupling member 531, and the like may be employed in order to reduce friction during rotation of the ball nut 130 and to improve noise performance by preventing or reducing the movement of the ball nut 130.

Referring to FIGS. 6 and 7, the support member 511 for supporting the first rolling member 141 and the second rolling member 142 may include the third inward protrusion 512 protruding from the inner circumferential surface of the support member 511. In this structure, the first rolling member 141 may be supported on one side surface of the third inward protrusion 512 in the axial direction, and the second rolling member 142 may be supported on the other side surface of the third inward protrusion 512 in the axial direction.

As the rotation of the ball nut 130 is supported by the first and second rolling members 141 and 142 in a wider range in the axial direction comparing with a situation where rolling members are arranged in a single row, and the number of rolling members is increased, supporting capacity for radial and axial loads can be increased, and the noise performance can be improved as the movement of the ball nut 130 is prevented or reduced.

As described below in further detail, the first rolling member 141 may be supported by the support portion 521 of the ball nut 130 and be axially supported between the third inward protrusion 512 and a second outward protrusion 522, and the second rolling member 142 may be supported by the coupling member 531 and be axially supported between the third inward protrusion 512 and a third outward protrusion 532.

That is, the first and second rolling members 141 and 142, the ball nut 130, and the coupling member 531 may be assembled in the order of the first rolling member 141 and the ball nut 130 from one side, and in the order of the second rolling member 142 and the coupling member 531 from the other side, in the axial direction with respect to the third inward protrusion 512.

Meanwhile, in order for the torque of the motor 111 to be translated by the rotation of the ball nut 130 and then transferred to the rack bar 120, a lock screw 171 for fixing the ball nut 130 in the axial direction may be employed or the support member 511 may be integrated with the housing 110.

In one embodiment, one of one side surface and the other side surface of the support member 511 in the axial direction may be supported by the housing 110, and the other may be coupled to the lock screw 171 coupled to the housing 110 as shown in FIG. 8.

A stepped portion 110a may be disposed on an inner circumferential surface of the housing 110. The support member 511 can be placed on the stepped portion 110a, and the lock screw 171 may be coupled to the housing 110 on the opposite side of the stepped portion 110a.

Since the support member 511 is disposed between the housing 110 and the lock screw 171, the second outward protrusion 522 of the support portion 521 may be supported by the first rolling member 141, and the third outward protrusion 532 of the coupling member 531 may be supported by the second rolling member 142. In this situation, the ball nut 130 can be fixed in the axial direction, and be rotated by the motor 111.

In this structure, one or more elastic members 181 and 182 may be disposed in the axial direction at at least one of a location between the support member 511 and the housing 110 and a location between the support member 511 and the lock screw 171, and thereby, the movement of the ball nut 130 can be prevented or reduced and the noise performance can be improved.

Alternatively, the support member 511 may be integrated with the housing 110 as shown in FIG. 9.

That is, since the third inward protrusion 512 of the support member 511 is disposed on the inner circumferential surface of the housing 110, and the second and third outward protrusions 522 and 532 are supported by the first and second rolling members 141 and 142, respectively, the ball nut 130 can be fixed in the axial direction, and be rotated by the motor 111.

Meanwhile, the coupling member 531 may have a coupling hole 533 passing through a portion of the coupling member 531 in the axial direction, and the ball nut 130 may have a coupling portion 523 inserted into the coupling hole 533. Thereby, the coupling member 531 and the ball nut 130 can be coupled as shown in FIG. 6.

That is, the coupling member 531 may be formed in a ring shape, and the third outward protrusion 532 may be formed on the outer circumferential surface thereof. Thereby, the coupling portion 523 can be supported on the inner circumferential surface thereof.

The coupling portion 523 may be formed to axially protrude from the support portion 521, and be inserted into the coupling hole 533.

The coupling member 531 may be coupled to the coupling portion 523 by press fitting (not shown), or may be fixed by a fixing member 541 coupled to the coupling portion 523.

Although figures show an embodiment in which a snap ring is used as the fixing member 541; however, embodiments of the present disclosure are not limited thereto. For example, a lock nut or the like may be used.

That is, after the coupling portion 523 is inserted into the coupling hole 533, the fixing member 541 may be coupled to the coupling portion 523 to be supported by the coupling member 531 on the opposite side of the support portion 521, and thereby, the coupling member 531 can be fixed.

Referring to FIG. 8, as described above, the first rolling member 141 and the second rolling member 142 may be disposed on both sides of the third inward protrusion 512. In this case, in order to easily assemble the first rolling member 141 and the second rolling member 142, an inner diameter of the remaining portion of the support member 511 except for the third inward protrusion 512 may be needed to be greater than that of the third inward protrusion 512.

That is, the inner diameter of the support member 511 from one end thereof in the axial direction to the third inward protrusion 512 and the inner diameter of the support member 511 from the other end thereof in the axial direction to the third inward protrusion 512 may be greater than the inner diameter of the third inward protrusion 512.

In other words, the inner diameter of the inner circumferential surface of the remaining portion of the support member 511 except for the third inward protrusion 512 may be greater than the inner diameter of the third inward protrusion 512.

Accordingly, the first rolling member 141 and the second rolling member 142 can be supported on the inner circumferential surface of the support member 511 without being caught at one end or the other end of the support member 511 in the axial direction, and thereafter, the first rolling member 141 and the second rolling member 142 can be placed on the support member 511 by being caught the third inward protrusion 512.

Further, the support portion 521 may include the second outward protrusion 522 that outwardly protrudes from the outer circumferential surface thereof and supports the first rolling member 141, and the coupling member 531 may include the third outward protrusion 532 that outwardly protrudes from the outer circumferential surface thereof and supports the second rolling member 142.

The second outward protrusion 522 may be disposed at one end of the support portion 521 in the axial direction and can support the first rolling member 141 through the other side surface of the second outward protrusion 522, and the third outward protrusion 532 may be disposed at the other end of the coupling member 531 in the axial direction and can support the second rolling member 142 through one side surface of the third outward protrusion 532.

That is, the first rolling member 141 may be disposed between the third inward protrusion 512 and the second outward protrusion 522, and the second rolling member 142 may be disposed between the third inward protrusion 512 and the third outward protrusion 532.

The first rolling member 141 may be fixed, or operatively disposed, in the axial direction between the support member 511 and the support portion 521 by the third inward protrusion 512 and the second outward protrusion 522, and the second rolling member 142 may be fixed, or operatively disposed, in the axial direction between the support member 511 and the coupling member 531 by the third inward protrusion 512 and the third outward protrusion 532.

In this case, an outer diameter of the support portion 521 from the other end thereof in the axial direction to the second outward protrusion 522 may be smaller than an outer diameter of the second outward protrusion 522, and an outer diameter of the coupling member 531 from one end thereof in the axial direction to the third outward protrusion 532 may be smaller than an outer diameter of the third outward protrusion 532.

That is, the outer diameter of the outer circumferential surface of the remaining portion of the support portion 521 except for the second outward protrusion 522 may be smaller than the outer diameter of the second outward protrusion 522, and the outer diameter of the outer circumferential surface of the remaining portion of the coupling member 531 except for the third outward protrusion 532 may be smaller than the outer diameter of the third outward protrusion 532.

Since the ball nut 130 and the coupling member 531 are disposed outside of the first rolling member 141 and the second rolling member 142 with respect to the third inward protrusion 512, when the ball nut 130 is assembled from one side to the other side in the axial direction, the first rolling member 141 can be supported on the outer circumferential surface of the support portion 521 without being caught at the other end of the support portion 521, and thereafter, be placed on the support portion 521 by being caught by the second outward protrusion 522, and when the coupling member 531 is assembled from the other side to one side in the axial direction, the second rolling member 142 can be supported on the outer circumferential surface of the coupling member 531 without being caught at one end of the coupling member 531, and thereafter, be placed on the coupling member 531 by being caught by the third outward protrusion 532.

When the first rolling member 141 and the ball nut 130 are assembled on one side of the third inward protrusion 512, and the second rolling member 142 and the coupling member 531 are assembled on the other side thereof, the first rolling member 141 and the second rolling member 142 can be supported on the inner circumferential surface of the support member 511 without being caught at one end and the other end of the support member 511 in the axial direction, and thereafter, be placed on the support member 511 by being caught by the third inward protrusion 512, and the first rolling member 141 and the second rolling member 142 can be supported on the outer circumferential surface of the support portion 521 and the outer circumferential surface of the coupling member 531 without being caught at the other end of the support portion 521 and one end of the coupling member 531, and thereafter, be placed by being caught by the second outward protrusion 522 and the third outward protrusion 532.

Therefore, the first rolling member 141 and the second rolling member 142, the first supporting member 511, the second supporting member 511, and the ball nut 130 can be assembled by simply sliding in the axial direction. In turn, convenience of assembling can be improved, and the number of components required to support the rotation of the rolling members can be reduced compared to the conventional steering device.

Thus, the rack-driven power assisted steering apparatuses according to the embodiments described herein, it is possible to: improve noise performance by absorbing the movement of the ball nut in the structure in which rolling members supporting the rotation of the ball nut are arranged in double rows, and the ball nut assembly is coupled to the housing via elastic members; reducing the number of components employed for supporting the rolling members; and easily assembling the employed components.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

CROSS-REFERENCE TO RELATED APPLICATION

This application is the U.S. National Phase under 35 U.S.C. § 371 of International Patent Application No. PCT/KR2020/006361, filed on May 14, 2020, which claims priority from Korean Patent Application No. 10-2019-0059893, filed on May 22, 2019, which is hereby incorporated by reference for all purposes as if fully set forth herein. In addition, if this patent application claims priority for countries other than the United States for the same reason as above, all the contents are incorporated into this patent application by reference.

What is claimed is:

1. A rack-driven power assisted steering apparatus comprising:
   a ball nut that
      includes a support portion having a first protrusion protruding from an outer circumferential surface of the ball nut, and
      supports a first rolling member through one side surface, and a second rolling member through the other side surface, of the first protrusion in an axial direction;
   a first support member disposed between an inner circumferential surface of a housing and the first rolling member; and
   a second support member separate from the first support member and disposed between the inner circumferential surface of the housing and the second rolling member,
   wherein
   one of the first support member and the second support member is supported in the axial direction by the housing, and the other of the first support member and the second support member is supported in the axial direction by a lock screw coupled to the housing, and
   a first elastic member supported in the axial direction is disposed at a first location between the lock screw and one of the first support member and the second support member and is in contact with the lock screw.

2. The rack-driven power assisted steering apparatus according to claim 1, wherein a second elastic member supported in the axial direction is disposed at a second location between the housing and the other of the first support member and the second support member.

3. The rack-driven power assisted steering apparatus according to claim 1, wherein an outer diameter of the support portion from one end in the axial direction to the first protrusion and an outer diameter of the support portion from the other end in the axial direction to the first protrusion are smaller than an outer diameter of the first protrusion.

4. The rack-driven power assisted steering apparatus according to claim 1, wherein
   the first support member includes a second protrusion that protrudes from an inner circumferential surface of the first support member and supports the first rolling member, and
   the second support member includes a third protrusion that protrudes from an inner circumferential surface of the second support member and supports the second rolling member.

5. The rack-driven power assisted steering apparatus according to claim 4, wherein
   the second protrusion is formed at one end of the first support member in the axial direction and supports the first rolling member through the other side surface of the second protrusion, and
   the third protrusion is formed at the other end of the second support member in the axial direction and supports the second rolling member through one side surface of the third protrusion.

6. The rack-driven power assisted steering apparatus according to claim 5, wherein
   an inner diameter of the first support member from the other end in the axial direction to the second protrusion is greater than an inner diameter of the second protrusion, and
   an inner diameter of the second support member from one end in the axial direction to the third protrusion is greater than an inner diameter of the third protrusion.

7. The rack-driven power assisted steering apparatus according to claim 1, wherein the other of the first support member and the second support member is supported in the axial direction and in a radial direction perpendicular to the axial direction by the lock screw.

\* \* \* \* \*